United States Patent Office 3,523,800
Patented Aug. 11, 1970

3,523,800
METHOD OF EXTRACTING SALT SOLUBLE PROTEIN FROM POST-RIGOR MEAT
Jack C. Trautman, Madison, Wis., assignor to Oscar Mayer & Co., Inc., Chicago, Ill., a corporation of Illinois
No Drawing. Filed July 15, 1966, Ser. No. 565,415
Int. Cl. A22c *11/00;* A23j *1/02*
U.S. Cl. 99—107                        3 Claims

ABSTRACT OF THE DISCLOSURE

A process for improving the binding or emulsion-forming properties of post-rigor meats used in sausages, luncheon meats, and similar ground meat products. In particular, salt soluble protein, substantially entirely in the form of actomyosin, is extracted at a temperature of from 0° C. to −15° C. with a sodium chloride solution having a sodium chloride content of from approximately 2% to 12%, by weight. The weight ratio of the sodium chloride solution to meat ranges from approximately one-tenth part to five parts of aqueous chloride solution for each one part of post-rigor meat and the time of extraction ranges from approximately 5 minutes to 24 hours.

---

The present invention generally relates to the manufacture of sausages, luncheon meats and similar ground meat products and, more particularly, relates to a method of improving the binding or emulsion-forming properties of post-rigor meats used in such ground meat products. This invention is specifically concerned with an improved method of extracting salt soluble proteins from post-rigor meats enabling the use of lesser amounts of post-rigor meats as the binder or emulsion-forming constituents in these ground meat products without reducing the quality thereof. In this regard, it has been found that post-rigor meats when processed in accordance with the method of the present invention exhibit binding and emulsion-forming properties which favorably compare with those of pre-rigor meats.

Those skilled in the art of making sausages, luncheon meats, and similar ground meat products recognize that to have consistent high quality products, without fat and water separation, it is desirable that a portion of the meat formula consist of pre-rigor meat. The use of pre-rigor meats in sausage and other ground meat products is thoroughly discussed in U.S. Letters Patent No. 2,874,060. In particular, the invention described therein involves first freezing the meat of a freshly killed animal before rigor mortis has developed (e.g., within four to six hours after slaughter). Preferably, the fresh meat is then first hot boned and cut into pieces small enough to be frozen within a short time. After being frozen solid, the meat is then kept in that condition until ready for use in making a sausage product. When the meat is to be processed into a sausage product it is coarsely chopped in its unthawed condition and the salt soluble protein extracted therefrom in the presence of salt and water as the meat particles thaw. This salt soluble protein is then uniformly distributed throughout the sausage batter.

The preferred use of pre-rigor meats as described above has been based on the inability, under conventional processing techniques, to obtain satisfactory binding and emulsion-forming properties with like amounts of post-rigor meats. Accordingly, in sausage formulations which did not include pre-rigor meat as the binder constituent it has been necessary to use greater amounts of post-rigor meat in order to provide a product of acceptable quality.

In accordance with the present invention, it has been found that increased amounts of salt soluble protein can be extracted from post-rigor meats at temperatures below 0° C. Post-rigor meats so processed yield an amount of salt soluble protein which compares favorably with that extracted from pre-rigor meats. As such, it has been found that by processing post-rigor meats in accordance with the improved low temperature salt soluble protein extraction techniques of the present invention, substantially reduced amounts thereof can be used as the binder or emulsion-forming constituent in sausages, luncheon meats and similar ground meat products. In particular, the present invention offers the important advantage of being able to use amounts of post-rigor meats as binders in the manufacture of sausage, luncheon meats and other ground meat products which favorably compare with those used with pre-rigor meats without reduction in product quality.

The present invention is useful in the production of sausage in both impermeable casings (e.g., Saran) as well as those in permeable casings. Additionally, it should be noted that this invention is also useful in the manufacture of ground meat products which are packed into metal containers (i.e., "tin cans"). Typically, the present invention has been advantageously used in the making of ham and cheese loaf, smokie links, wieners, bologna, pork sausage, and the like.

It is, therefore, an important object of the present invention to provide a method of improving the binding or emulsion-forming properties of post-rigor meats used in sausages, luncheon meats, and other ground meat products.

Another important object of the present invention is to provide an improved process for extraction of increased amounts of salt soluble protein from post-rigor meats.

Another important object of the present invention is to provide an improved salt soluble protein extraction technique for treating post-rigor meats which are to be used as the binder constituent in sausages, luncheon meats, and comparable ground meat products, which extraction technique enables the use of reduced amounts of such post-rigor meats without reduction in the quality of the product so produced.

Another important object of the present invention is to provide a commercially practical method of treating post-rigor meat so that said post-rigor meat can be used in reduced amounts, approximating those used with pre-rigor meats, as a binder constituent in sausages, luncheon meats and similar ground meat products which products favorably compare with those made with pre-rigor meats.

Other and further objects of the present invention will be apparent from the following description which appears hereinafter.

In U.S. Letters Patent No. 2,874,060, described above, the advantageous use of pre-rigor meats as the binder or emulsion-forming constituents in sausage products is thoroughly discussed. The invention described in that patent primarily concerns itself with the extraction of myosin (a salt soluble protein present in pre-rigor meat). The present invention concerns itself with the extraction of actomyosin, a salt soluble complex protein formed by the combining of actin and myosin protein constituents during the rigor mortis process. Actomyosin is not normally present in pre-rigor meats.

In accordance with the present invention, it has been discovered that extraction of salt soluble proteins from post-rigor meats can be greatly enhanced where said extractions are carried out at below freezing temperatures. More particularly, it has been discovered that the amount of salt soluble proteins which can be extracted with a sodium chloride solution from post-rigor meat can be increased where said extraction is carried out within the temperature range of from 0° C. to −15° C., and preferably within the range of from −5° C. to −15° C. or at about −7° C. The concentration of the sodium chloride solutions which can be used in the practice of the present invention vary from approximately 2 to 12 percent, and the time required for obtaining maximum extraction from a given post-rigor meat sample can range from as little as 5 minutes to as much as 24 hours. Generally, the sodium chloride solution to meat ratio will range from around 1 part, by weight, of sodium chloride solution for each 2 parts of post-rigor meat to 5 parts of sodium chloride solution for each 1 part of post-rigor meat (from 1:2 to 5:1), however, as little as one-tenth part of aqueous sodium chloride solution for each 1 part of post-rigor meat can be advantageously used in the practice of this invention.

One technique for practicing the present invention involves combining a quantity of post-rigor meat with the other sausage or luncheon meat ingredients (e.g., other meats, spices, preservatives, etc.) and comminuting these ingredients to the desired particle size and consistency. The salt soluble proteins should then be extracted from the post-rigor meats in the presence of an aqueous sodium chloride solution which, in accordance with this invention, is maintained at a temperature of from 0° C. to −15° C. for a period of time sufficient to obtain maximum extraction of the salt soluble protein (actomyosin) from the post-rigor meat. If desired, the salt soluble proteins can be extracted from the post-rigor meat in the presence of a sodium chloride solution prior to mixing thereof with the other sausage ingredients. After extraction of the salt soluble proteins from the post-rigor meat has occurred and the other sausage ingredients thoroughly combined therewith, the sausage batter is then stuffed into a synthetic or natural casing, cooked or smoked, and further processed in accordance with conventional sausage making techniques.

The invention will now be described in conjunction with the following examples. The examples included herein are illustrative and not intended as a limitation on this invention.

Example 1 illustrates the effect of extraction temperature of muscle slurries on fat extraction.

EXAMPLE 1

Post-rigor beef femoris muscles were trimmed free of fat and connective tissue, cooled to 25° F., ground through a ⅛-inch plate, frozen in ⅜-inch sheets at −65° F. and then thawed to 32° F. Extraction slurries were prepared by placing 100 gm. of the thawed muscle into a 600 ml. beaker and adding 200 gm. of 4.66 percent sodium chloride solution thereto. The experimental variables used in this test included extraction for 15 and 120 minutes at −2° C. and +10° C.; and 67.5 minutes at 4° C. After extraction, the −2° C. and +4° C. slurries were warmed to 10° C. Emulsions were then prepared by transferring the slurries to a stainless steel Waring blender to which 115 gm. of pork fat were added and blended under vacuum conditions for 120 seconds. The emulsion stability was then determined by a modification of Rongey's method (E. H. Rongey, A.M.I. Meeting, March, 1964), which consisted of placing 16 gm. of emulsion into a glass centrifuge tube equipped with a wire gauze disc supporting a paper disc located mid-way in the body of the tube. Five centrifuge tubes were filled with each emulsion and heated to 160° F. for 30 minutes, immediately centrifuged for 10 minutes, and the amount of fat released from the cooked emulsion plug quantitatively determined by extraction with diethyl ether. The results of this analysis are presented in Table 1 below.

TABLE 1.—THE EFFECT OF EXTRACTION TEMPERATURES ON BEEF MUSCLE SLURRIES BEFORE THE FORMATION OF EMULSIONS WITH PORK FAT.

| Extraction conditions | | Percent fat separation from cooked emulsions | |
|---|---|---|---|
| Time (min.) | Temp. (° C.) | Series I | Series II |
| 15 | −2 | 2.0 | 1.0 |
| 15 | +10 | 16.8 | 20.0 |
| 67.5 | +4 | 14.6 | 7.0 |
| 120 | −2 | 4.3 | 4.1 |
| 120 | +10 | 21.3 | 16.9 |

From the above data it is apparent that the −2° C. extraction of muscle slurries for 15 and 120 minutes have a marked increase in emulsifying capacity. The fat emulsifying capacity is believed, by those skilled in this art, to be due to the presence of the solubilized salt soluble protein.

The following example illustrates the advantageous post-rigor extraction techniques of the present invention as applied to cow round.

EXAMPLE II

Part A

A sample of post-rigor cow round was ground through a ¼-inch plate. A 100 gm. portion of the thus ground post-rigor cow round was then combined with 275 ml. of 7 percent sodium chloride-water solution at a temperature of 0° C. This temperature was then reduced to −6.5° C. and stirred for 30 minutes after which time, the slurry was centrifuged at 13,000 r.p.m. 4.92 gm. of salt soluble protein were thus recovered with a least concentration of 0.70 percent. (The least concentration represents a determination of protein quality. For a complete explanation of the significance of this test and the procedure thereof see Journal of Food Science, p. 409, vol. 31 (1966), J. C. Trautman.)

Part B

A second 100 gm. portion from the ¼-inch ground cow round was mixed with 275 ml. of 7 percent sodium chloride-water solution at 0° C. This slurry was then stirred for 30 minutes with the temperature being maintained at 0° C. The slurry was then centrifuged at 13,000 r.p.m. Only 2.39 gm. of salt soluble protein with least concentration of 0.80 percent were recovered.

As the above results indicate, the Part A temperature extraction at −6.5° C. effected a recovery of more than two times the salt soluble protein recovered in Part B from an identical sample of ground cow round where this extraction temperature was maintained at 0° C.

The improved results obtained with the post-rigor salt soluble protein extraction techniques of the present invention as applied to wiener batters are demonstrated by the following example.

EXAMPLE III

Part A 192 pounds of post-rigor boneless cow meat were mixed with 204 pounds of 32° F. water and 28 lbs. 12 oz. of dry cure mix (a mixture of sodium chloride, sodium nitrate and spices) and passed through a heat exchanger wherein, in accordance with the present invention, the overall temperature was reduced to 16.5° F.

365 pounds of the above-described frozen mixture was then added to 61 pounds of veal, 29 lbs. 11¼ oz. of spice and 544 pounds of 50 percent pork trim. The entire mixture was then chopped in a silent cutter and then conventionally processed into wieners.

A 100 gm. sample of the above-described premix batter was taken, the soluble proteins extracted therefrom, recovered by centrifugation and fractionated by dialysis into the individual protein components.

Part B

A second premix wiener batter was prepared by taking 192 pounds of post-rigor boneless cow meat and combining the same with 204 pounds of water at 32° F. and 28 lbs. 12 oz. of a dry mix cure identical to that used in Part A. This mixture was maintained at 32° F. in order to provide a sample with which the low temperature protein extraction techniques of this invention, as applied to Part A above, could be compared.

365 pounds of the above mixture was then added to 61 pounds of veal, 29 lbs. 11¼ oz. of spice and 544 pounds of 50 percent pork trim. The entire mixture was then chopped and processed into wieners.

A 100 gm. sample of the premix batter of Part B was taken, the soluble proteins extracted therefrom, recovered by centrifugation and fractionated by dialysis into the individual protein components.

Table 2, below, sets forth the comparative data of the 100 gm. samples of the Part A premix wiener batter prepared in accordance with the techniques of the present invention and that of the Part B premix wiener batter prepared from post-rigor boneless cow meat which was not processed in accordance with the low temperature extraction techniques of the present invention.

TABLE 2.—COMPOSITION OF PROTEIN EXTRACTS FROM 100 GMS. OF PART A AND PART B WIENER PREMIX BATTERS

| | Part A Sample (gm.) | Part B Sample (gm.) |
|---|---|---|
| Total Kjeldahl N as protein [1] | 2.38 | 2.12 |
| Non-protein nitrogen | 0.19 | 0.48 |
| Water soluble protein | 0.40 | 0.78 |
| Salt soluble protein | 1.79 | 0.86 |

[1] A nitrogen determination test from which the total protein content is ascertained.

As the above data indicates, more than twice as much salt soluble protein was extracted from the post-rigor boneless cow meat processed at 16.5° F. (−8.6° C.) as compared to that obtained where the extraction temperature was maintained at 32° F. (0° C.).

The following example illustrates the advantages of the low temperature salt soluble protein extraction techniques of the present invention as applied to a luncheon meat product, ham and cheese loaf.

EXAMPLE IV

Those skilled in the art of making luncheon meats recognize that it is advantageous to use frozen pre-rigor muscle in the meat formula. This is particularly true in products such as ham and cheese loaf where the amount of water included in the formulation is kept to a minimum. This example illustrates how the low temperature extraction techniques of this invention can be used with post-rigor ham muscle so that the same can be used as a replacement for frozen pre-rigor ham muscle.

In this example three separate ham and cheese loaf batters were prepared from the following ingredients:

Ham muscle—18 lbs.
80 percent ham trim—12 lbs.
Cooked ham rework—3.8 lbs.
Ham and cheese rework—3.8 lbs.
Processed cheese—3.7 lbs.
Spice—23.3 ozs.
Ascorbate solution—100 ml.

In Part A, the ham muscle consisted of frozen pre-rigor ham muscle. In Part B, the ham muscle consisted of post-rigor ham muscle which was processed in accordance with the low temperature salt soluble protein extraction techniques of this invention. In Part C, the ham muscle was post-rigor meat. The Part C sample, however, was processed in the same manner as the Part A sample so as to provide a control medium with which the advantages of the Part B sample could be compared.

Part A

In preparing the ham and cheese load of this example, the pre-rigor ham muscle, 80 percent ham trim, and spice were chopped in a silent cutter for 4½ minutes at a temperature of 35° F. The thus chopped product was stored over night at 32° F. The cooked ham rework, ham and cheese rework, processed cheese and ascorbate solution were then added to a vacuum mixer together with ham muscle, ham trim, and spice ingredients and mixed for three minutes to form the ham and cheese loaf batter. This batter was then stuffed into 100 oz. loaf tins and Saran tubes, cooked at 165° F. for 3½ hours and chilled to a temperature of 50° F. The tins were opened, inspected, cooking loss determined and the products submitted to a taste panel.

Part B

In this sample, post-rigor extraction techniques of the type embodied in the present invention were used. In particular, the ham muscle constituent called for in the above listing of ingredients consisted solely of post-rigor ham (i.e., 18 pounds of post-rigor ham muscle were used). The post-rigor ham was combined with 12 pounds of 80 percent ham trim and ground through a ⅛-inch plate, and 12 percent, by weight, added as saturated sodium chloride solution. The slurry thus formed was then stored for 24 hours at a temperature ranging from 24° F. to 28° F. Since the sodium chloride was added to this mixture, the spice mixture called for in the above listing of ingredients was omitted. The remainder of the steps involved in the preparation of this ham and cheese loaf sample were identical to those set forth above in Part A.

Part C

All ingredients were post-rigor and were processed in an identical manner as that described in Part A.

After the over-night storage of each of the chopped batters at 32° F., 100 gm. samples of each batter were fractionated in a laboratory to determine the amount of soluble protein contained therein. The results obtained are set forth below in Table 3.

TABLE 3.—THE EFFECT OF LOW TEMPERATURE EXTRACTION OF POST-RIGOR MEAT ON THE PROTEIN SOLUBILITY AND HAM AND CHEESE LOAF QUALITY

| | Soluble protein components (percent of total protein) | | | | Taste panel | | |
|---|---|---|---|---|---|---|---|
| Part | Salt soluble | Water soluble | Non-protein nitrogen | Cooking loss percent | Flavor | Texture | Preference |
| A | 18.5 | 9.4 | 6.7 | 0.5 | 3.53 | 3.71 | 7 of 14 |
| B | 19.1 | 9.3 | 5.4 | 0.37 | 3.60 | 3.93 | 7 of 14 |
| C | 10.7 | 12.0 | 7.8 | 8.5 | 3.00 | 2.36 | 0 of 14 |

The results given in Table 3 above demonstrate the advantages of the low temperature extraction techniques of the present invention. As is shown, the sample of Part A, containing only pre-rigor ham, yielded an 18.5 percent salt soluble protein component of the total protein content. The sample of Part B, which employed the use of low temperature salt soluble protein extraction techniques of the present invention yielded a greater salt soluble protein component of the total protein content, viz 19.1 percent. On the other hand, the sample of Part C, composed of all post-rigor meat and conventionally processed, yielded a salt soluble protein component of 10.7 percent of the total protein content, approximately half that of the sample of Part B. A taste panel of fourteen individuals was equally divided between the samples of Parts A and B. Accordingly, the use of the low temperature salt soluble extraction techniques of the present invention enabled the production of a ham and cheese loaf product using post-rigor ham muscle which favorably compared with that obtained in a similar product using pre-rigor ham muscle and was decidedly superior to that obtained where conventionally processed post-rigor meat was used.

Those skilled in the art of making coarse ground sausage products generally recognize that inclusion of pre-rigor meat into the recipe results in improved product quality and uniformity. It was found that when the low temperature soluble salt extraction techniques of the present invention were applied on post-rigor meats, that these post-rigor meats could be substituted in place of the pre-rigor cow meat without a reduction of product quality.

The following example demonstrates the advantageous use of low temperature salt soluble protein extraction techniques of the present invention in connection with the making of smokie link sausages.

EXAMPLE V

In this example, three separate smokie link batters were prepared from the following ingredients:

50 percent pork trim—9.0 lbs.
Cow meat—6.0 lbs.
80 percent pork trim—15.0 lbs.
Ice and water—7.5 lbs.
Sodium chloride—13.3 ozs.
Cure—37.6 gm.
Dry corn syrup—11.8 ozs.
Spice—4.2 ozs.

Part A

In this batch of smokie link batter, the cow meat constituent consisted of frozen pre-rigor cow meat. All of the above ingredients, including the frozen pre-rigor cow meat, were combined and chopped in a silent cutter for about 30 seconds after which time they were ground through a 3/16-inch plate and stuffed into No. 26 cellulose casings. These casings were then placed in a smoke house wherein they were conventionally processed. For test purposes, portions of the smokie links thus formed were packaged in a vacuumized impermeable film.

Part B

In this batch of smokie link batter, the cow meat consisted of post-rigor cow meat. In making this batch of smokie links, the 6.0 pounds of post-rigor cow meat and 80 percent pork trim were ground through a 1/4-inch plate and then combined with 13.3 ounces of sodium chloride and sufficient water and ice to make a 7 percent sodium chloride aqueous phase. This slurry was then held for 24 hours at a temperature of from 24° F. to 26° F. during which time the salt soluble protein was extracted. The remaining ingredients in the recipe were then combined with this slurry and processed in the same manner as that described above in connection with Part A.

Part C

In this batch of smokie link batter, all the meat ingredients, including the cow meat, were post-rigor. Processing was done in the manner identical to that of Part A.

In order to evaluate each of the above smokie link batters, 100 gm. samples of each were taken, fractionated in the laboratory and analyzed to determine how much salt soluble protein could be extracted. After processing, the amount of free fat associated with each link was also determined. The products that were packaged in the vacuumized impermeable films were held for one week at 45° F. before the amount of free water inside the packages was ascertained. The results of these tests are set forth in Table 4 below.

TABLE 4.—THE EFFECT OF LOW TEMPERATURE EXTRACTION OF POST-RIGOR MEAT ON SMOKIE LINK QUALITY

| Part | Percent of batter protein fractionated as salt soluble protein | Percent cooking loss | Fat separation (gm./link) | Free water in package (gm./link) |
|---|---|---|---|---|
| A | 10.1 | 17.5 | 0.213 | 2.0 |
| B | 10.0 | 15.2 | 0.203 | 1.1 |
| C | 4.6 | 19.8 | 0.340 | 3.4 |

As is apparent from the above data, the results obtained with post-rigor cow meat muscle processed in accordance with the techniques of the present invention closely approximated those obtained with pre-rigor cow meat muscle with regard to the percent of batter protein fractionated as salt soluble protein. The test data further showed that smokie links made in accordance with the method of this invention were superior to those made with frozen pre-rigor cow meat with regard to cooking loss, fat separation and free water separation. The advantages of the present invention became most apparent when the results of the tests on the products of Parts B and C were compared. In particular, the percent batter protein fractionated as salt soluble protein with the Part B post-rigor cow meat muscle treated in accordance with the method of the present invention was more than twice that extracted from the Part C post-rigor cow meat processed in the conventional manner.

As mentioned above, the present invention is directed to the manufacture of sausage, luncheon meats and similar ground meat products. As such, this invention can be practiced in a number of embodiments, each of which provides important advantages. In this regard, it should be noted that modifications and variations from the precise steps set forth in the above description and examples can be made by those skilled in this art without departing from the spirit and scope of this invention. Accordingly, only such limitations as are indicated in the appended claims should be imposed thereon.

What is claimed is:

1. The method of extracting increased amounts of salt soluble protein from post-rigor meats which are used in the manufacture of sausage, luncheon meat, and similar ground meat products which comprises at least coarsely comminuting the post-rigor meat and, extracting the salt soluble protein from said post-rigor meat in the presence of an aqueous sodium chloride solution at a temperature of from 0° C. to −15° C., said sodium chloride solution having a sodium chloride content of from 2 to 12 percent, by weight, the weight ratio of said aqueous sodium chloride solution to meat ranging from one-tenth part to 5 parts of aqueous sodium chloride solution for each one part of post-rigor meat, said time of extraction of the salt soluble protein ranging from 5 minutes to 24 hours.

2. The method claim 1 wherein the temperature of extraction is maintained between −5° C. to −15° C.

3. The method of claim 1 wherein the temperature of extraction is maintained at approximately −7° C.

References Cited

UNITED STATES PATENTS

| | | | |
|---|---|---|---|
| 2,874,060 | 2/1959 | Turner et al. | 99—107 X |
| 2,999,019 | 9/1961 | Hopkins et al. | 99—107 |
| 3,050,399 | 8/1962 | Kielsmeier et al. | 99—109 |
| 3,353,963 | 11/1967 | Podebradsky et al. | 99—109 |

HYMAN LORD, Primary Examiner

U.S. Cl. X.R.

99—108, 109